UNITED STATES PATENT OFFICE.

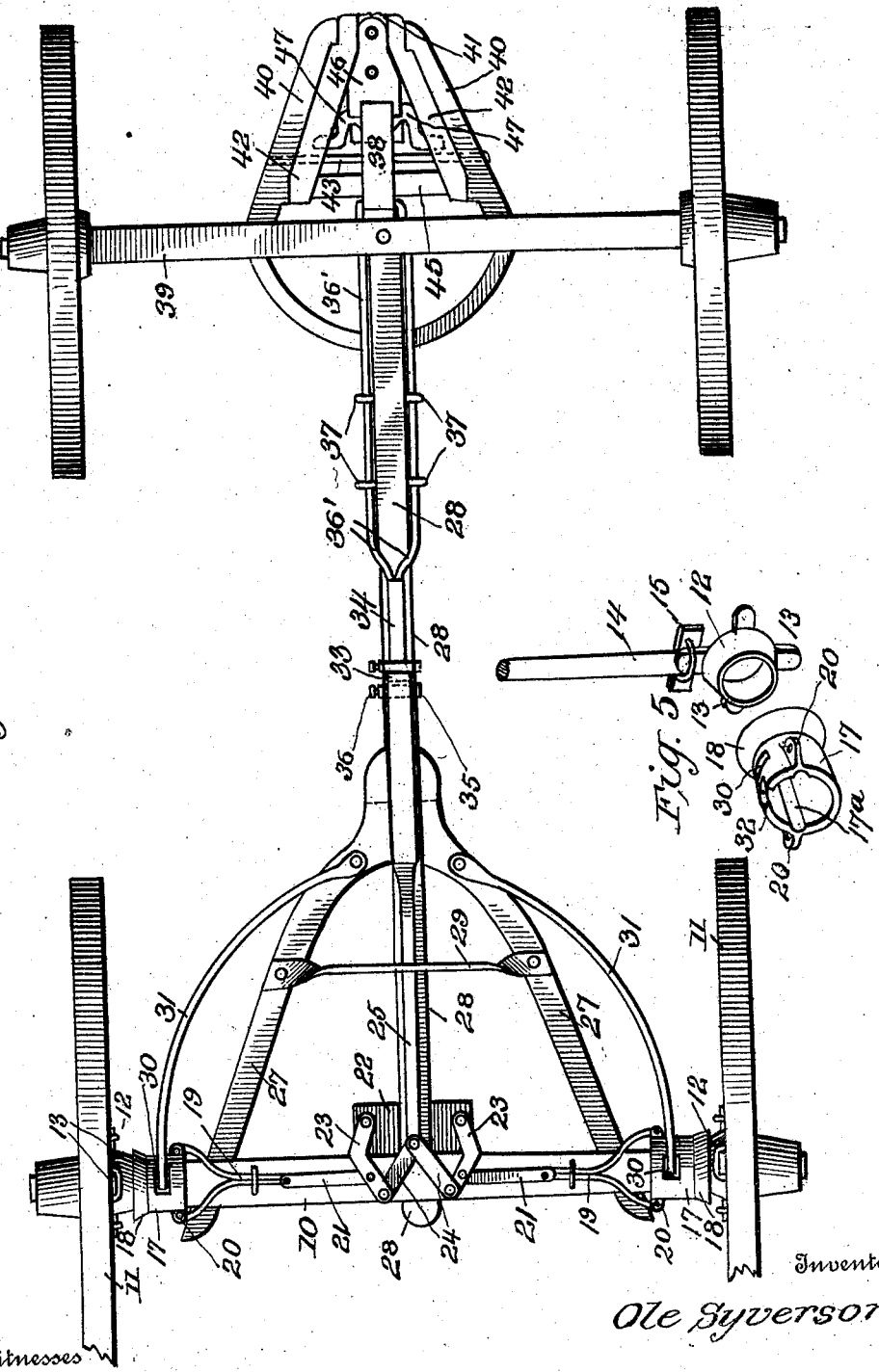

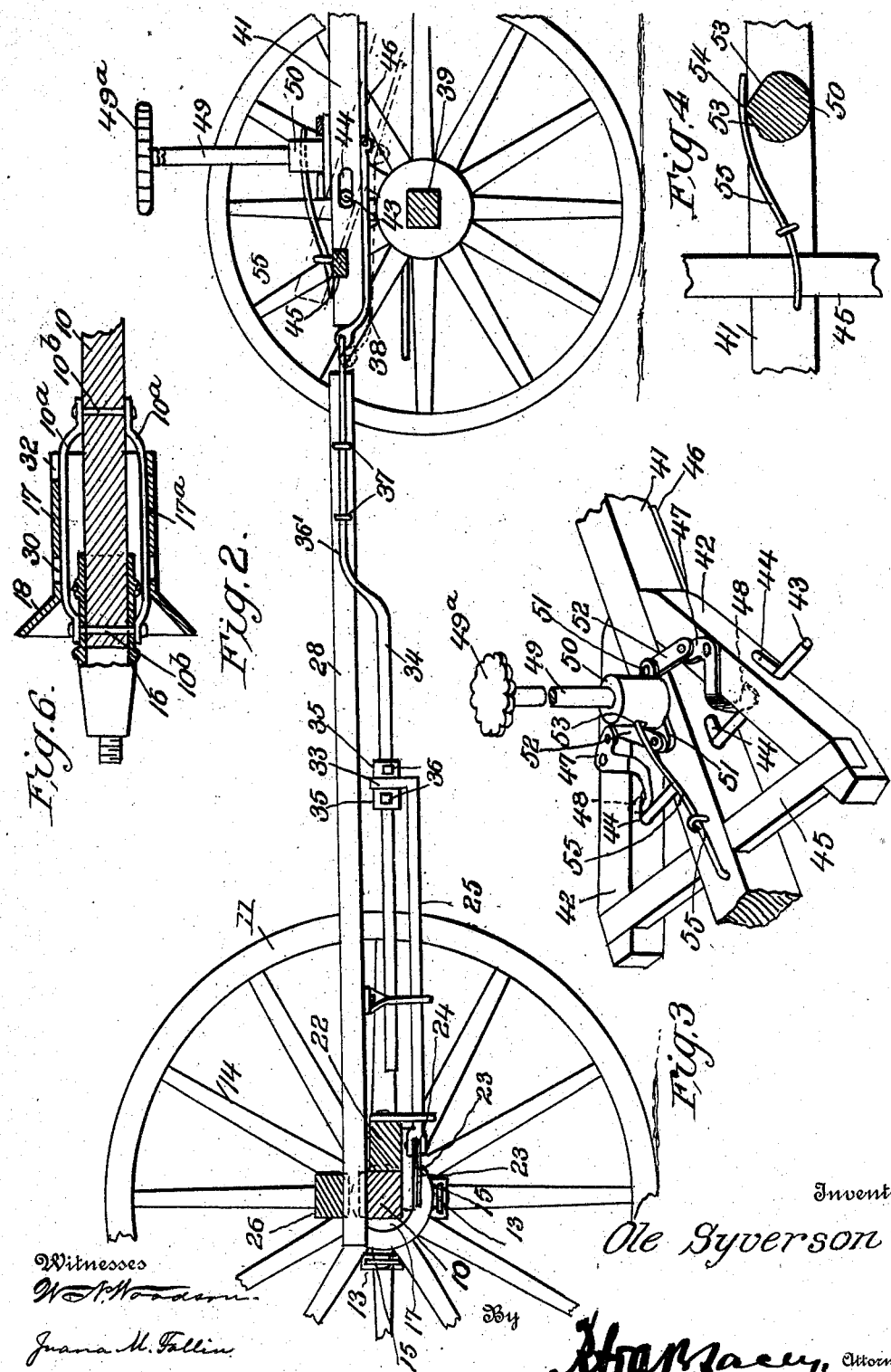

OLE SYVERSON, OF TOLLEY, NORTH DAKOTA.

AUTOMATIC WAGON-BRAKE.

981,138. Specification of Letters Patent. Patented Jan. 10, 1911.

Application filed May 7, 1910. Serial No. 560,041.

*To all whom it may concern:*

Be it known that I, OLE SYVERSON, citizen of the United States, residing at Tolley, in the county of Ward and State of North Dakota, have invented certain new and useful Improvements in Automatic Wagon-Brakes, of which the following is a specification.

This invention relates to wagon brakes and has for an object to provide a brake mechanism adapted to check the rear wheels of a wagon upon the backward movement of the pole or tongue.

Another object of this invention is to provide a braking mechanism with means to lock the same from operation when it is desired to back the wagon.

The invention comprehends a brake mechanism which is adaptable to wagons varying in length, and which provides an effective braking of the wheels by the movement of the draft animals which are attached to the tongue.

For a full understanding of the invention reference is to be had to the following description and accompanying drawings, in which:—

Figure 1 is a top plan view of the running gear of a wagon having the improved brake applied thereto. Fig. 2 is a longitudinal central section through the same. Fig. 3 is a detail perspective view of the rear end of the tongue and the attachments thereto. Fig. 4 is a detail sectional view of the rear axle and the clutch carried thereby. Fig. 5 is a detail perspective view of the cone and the clutch. Fig. 6 is a sectional view of the drum and the retaining spring therefor.

Corresponding and like parts are referred to in the following description and indicated in all the views of the drawings by the same reference characters.

Referring to the drawings the numeral 10 designates the rear axle of the wagon which is provided at its opposite ends with supporting wheels 11. The wheels 11 are of a common construction and carry upon the inner ends of the hubs thereof cones 12. The cones 12 are in the form of rings or bands which are provided with outer smooth faces and are held in position by a plurality of arms 13 registering with the spokes 14 of the wheel, and are secured rigidly against the inner sides thereof by cleats 15. The wheels 11 are mounted upon the axle 10 in the usual manner through the medium of skeins 16.

Upon each end of the axle 10 a clutch 17 is disposed which is in the form of a sleeve for loose engagement about the axle 10 and having a flared outer extremity 18 for snug engagement over the cone 12. The clutch sleeves 17 are provided at their inner faces with opposite longitudinal recesses 17$^a$ to receive the corresponding guide strips 10$^a$ which are carried upon the outer ends of the axle 10. The guide strips 10$^a$ are in the form of flattened metallic bars which are turned inwardly at their opposite ends to seat against the sides of the axle 10 and the skein 16. Clamping bolts 10$^b$ are employed for securing the guide strips 10$^a$ in position. The clutch sleeve 17 is thus permitted to move longitudinally over the axle 10, and is held from rotation thereon. A fork 19 is slidably disposed beneath each end of the axle 10, the arms of the fork 19 being curved upwardly against the opposite sides of the axle and being secured at their extremities to the inner ends of the clutches 17 and at the opposite sides thereof. The clutches 17 are provided with projections 20 to which the arm of the forks 19 are attached. The inner ends of the forks 19 are pivotally connected to the outer ends of bars 21 through which the forks receive their movement. The axle 10 is provided midway of its ends and against its forward edge with a block 22. Elbow arms 23 are hingedly secured at one end against the under face of the block 22 and extend backwardly therefrom against the under side of the axle 10. The rear ends of the elbow arms 23 are provided with toggle levers 24 which extend forwardly between the arms 23 and are pivotally connected at their meeting ends to the rear extremity of a brake rod 25. The bars 21 are pivotally secured at their extremities upon the elbow arms 23 adjacent their point of connection with the toggle levers 24.

The axle 10 is provided with a bolster 26 to support in conjunction therewith the rear hounds 27. The axle 10 is further provided with a reach 28 which receives the forward ends of the hounds 27 against the opposite edges thereof. A brace 29 is disposed across the under sides of the hounds 27 to support the brake rod 25. The brace 29 is in the form of a strip of metal which is twisted at right angles midway of its ends and which is suitably apertured to loosely receive the brake rod 25. The sleeves or clutches 17 are provided in their under faces with longitudinal slots 30 to admit of the passage of brace arms 31 therethrough. The arms 31 are secured to the axle 10 adjacent its extremities and extend forwardly to engage against the under face, and adjacent the forward ends of the hounds 27. The sleeves 17 are also cut away as at 32 to accommodate the extremities of the bolster 26. The forward end of the brake rod 25 is provided with an upturned ear 33 through which is passed a longitudinal rod 34. The rod 34 is adjustably disposed through the ear 33 by a pair of collars 35 which are arranged against the opposite sides of the ear 33 and held in such adjustment by means of set screws 36. The forward end of the longitudinal rod 34 terminates in a bail 36′, the opposite arms of which are curved outwardly and upwardly to snugly fit against the edges of the reach 28. The bail 36′ is held in such position by the employment of a plurality of cleats 37 carried in the edges of the reach 28. The bail 36′ passes about the forward extremity of the reach 28, and is advanced slightly beyond the same to hingedly receive the rear end of a strap 38. The reach 28 is attached to the front axle 39 of the vehicle in the usual manner. The axle 39 is provided with the fore-hounds 40. A pole or tongue 41 is arranged between the hounds 40 and is provided with diverging arms 42 for loose engagement against the inner edges of the hounds 40. A transverse pin 43 is secured through the hounds 40 and through longitudinal slots 44 provided midway of the ends and within the arms 42. The pole or tongue 41 extends rearwardly between the arms 42 and is reinforced by a cross brace 45. The brace 45 is seated within the upper faces of the arms 42 and the tongue 41. A plate 46 is rigidly secured against the under side of the tongue 41, the plate terminating at its rear end at a point forwardly of the transverse pin 43. The forward end of the strap 38 is hingedly attached to the rear end of the plate 46 for the purpose of loosely connecting the bail 36 to the tongue 41.

In connection with this form of brake an improved locking means is employed which comprises a pair of bell crank levers 47 which are hinged upon the upper face of the arms 42 at points forwardly of the slots 44. The long arms of the bell crank levers 47 are carried inwardly and are curved downwardly against the inner edges of the arms 42 to loosely fit thereagainst. The lower extremities of the long arms of the levers 47 are turned inwardly to form fingers 48 for engagement in the slots 44 and to rest against the forward side of the transverse pin 43. The tongue 41 is provided with a post 49 extending upwardly therefrom and adapted for rotation. The upper extremity of the post 49 carries a hand wheel 49ª for engagement by hand of the operator when it is desired to rotate the post 49. The lower end of the post 49 carries a drum 50 having lugs 51 radially extending from the lower end thereof and from its opposite sides. The short arms of the bell crank levers 47 are connected to the lugs 51 through the medium of links 52. The drum 50 is provided in its adjacent sides with peripheral slots or recesses to form flattened faces 53 and a shoulder 54. A leaf spring 55 is carried upon the upper face of the tongue 41 and rests within one of the recesses 53 at its outer end.

In the operation of the improved brake, the drum 50 is rotated to force the short arms of the bell crank levers 47 outwardly and to thereby retract the fingers 48 from the slots 44. When the vehicle is descending a grade and the draft animals exert a backward pressure upon the tongue 41, the tongue moves backwardly between the hounds 40 and carries the arms 42 therewith. As the fingers 48 are retracted from the slots 44 the arms 42 move freely over the pin 43. This movement of the tongue 41 is communicated through the strap 38 to the bail 36 which forces the longitudinal rod 34 backwardly beneath the reach 28. As the brake rod 25 is connected to the rod 34, the same is forced backwardly to operate the toggle levers 24 and to separate the arms 23. The bars 21 are thus moved toward the ends of the axle 10 to force the clutches 17 upon the cones 12. The force exerted upon the brake rod 25 to separate the arms 23 is thus communicated to the clutch 17 which binds proportionately over the cones 12 and produces the braking action of the wheels 11. As the brake rod 25 is adjustably attached to the longitudinal rod 34 by means of the sliding ear 33 and the adjustable collars 35, the improved mechanism is applicable to wagons, having reaches varying in length.

Many minor changes in the details of construction of this mechanism may be made without departing from the spirit of the invention or the basis upon which the operation of the device depends.

Having thus described the invention what is claimed as new is:—

1. In a brake mechanism the combination with a front axle fore-hounds carried by the front axle, a pole loosely disposed between the hounds, diverging arms carried by the poles, a transverse pin carried by said hounds and loosely engaged through said pole and said arms, bell crank levers pivoted upon the upper faces of said arms forwardly of said pin, fingers formed upon the long arms of said bell crank levers for engagement against the forward side of said pin to limit the backward movement of said tongue, means carried by the tongue for rotating said bell crank levers, and a brake mechanism attached to the rear end of said pole.

2. A brake mechanism including spaced axles, a reach carried by the axles, a sliding rod disposed longitudinally beneath the reach, a brake-rod adjustably connected to the longitudinal rod, sliding clutches carried upon the ends of one of the axles, spaced arms pivoted beneath the axle, bars connecting the clutches to the arms, connecting means disposed between the arms of said brake-rod for communicating motion therebetween, a bail carried upon the forward end of said longitudinal rod, a pole attached to the forward end of said bail to move the bail upon the operation of the pole, and locking means carried upon the forward one of said axles for holding the pole against movement.

3. In a brake mechanism, the combination with a pair of spaced axles, a reach connecting the axles, wheels carried upon the ends of the axles, and hounds disposed upon the front axle, a pole loosely disposed upon said hounds, a transverse pin carried by the hounds for loose engagement through the pole, spaced arms carried by the pole for reciprocation between said hounds and having longitudinal slots to loosely receive said transverse pin, and hinged fingers carried upon said arms for engagement in the slots to lock the arms against movement relative to the pin.

In testimony whereof, I affix my signature in presence of two witnesses.

OLE SYVERSON. [L. S.]

Witnesses:
W. E. HYNES,
OLANDER F. JOHNSON.